(12) United States Patent
Lanier et al.

(10) Patent No.: US 9,977,493 B2
(45) Date of Patent: May 22, 2018

(54) HYBRID DISPLAY SYSTEM

(71) Applicant: Microsoft Technology Licensing, LLC, Redmond, WA (US)

(72) Inventors: Jaron Lanier, Berkeley, CA (US); Joel S. Kollin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 206 days.

(21) Appl. No.: 14/742,592

(22) Filed: Jun. 17, 2015

(65) Prior Publication Data

US 2016/0370855 A1 Dec. 22, 2016

(51) Int. Cl.
*G06F 3/01* (2006.01)
*G06F 3/03* (2006.01)
(Continued)

(52) U.S. Cl.
CPC ............ *G06F 3/011* (2013.01); *G02B 27/017* (2013.01); *G06F 3/005* (2013.01); *G06F 3/012* (2013.01); *G06F 3/013* (2013.01); *G06F 3/017* (2013.01); *G06F 3/0304* (2013.01); *G06T 7/55* (2017.01); *H04N 5/2259* (2013.01); *H04N 5/335* (2013.01); *H04N 9/3173* (2013.01);
(Continued)

(58) Field of Classification Search
CPC .......... G06F 3/011; G06F 3/005; G06F 3/012; G06F 3/013; G06F 3/017; G06F 3/0304;
G06T 7/55; G06T 2207/10024; G02B 27/017; G02B 2027/0187; H04N 9/3173; H04N 13/0278; H04N 5/335; H04N 5/2259
See application file for complete search history.

(56) References Cited

U.S. PATENT DOCUMENTS 6,037,914 A   3/2000 Robinson
6,417,969 B1  7/2002 DeLuca et al.
(Continued)

FOREIGN PATENT DOCUMENTS

EP    2728444 A2   5/2014
EP    2869573 A1   5/2015
(Continued)

OTHER PUBLICATIONS

Wetzstein, et al., "Tensor Displays: Compressive Light Field Synthesis using Multilayer Displays with Directional Backlighting", In Journal ACM Transactions on Graphics, vol. 31, Issue 4, Jul. 2012, 11 pages.
(Continued)

*Primary Examiner* — Premal Patel
(74) *Attorney, Agent, or Firm* — Alleman Hall Creasman & Tuttle LLP (57) ABSTRACT

Embodiments are disclosed for a display system having multiple fields of view. An example display system comprises a first display configured to produce images across a first field of view, a second display configured to produce images across a second field of view, the second field of view being larger than the first field of view, and a controller configured to selectively present a virtual object via one or more of the first display and the second display based on a feature of the virtual object as displayed within a user's viewspace.

21 Claims, 8 Drawing Sheets

(51) Int. Cl.
*G02B 27/01* (2006.01)
*G06F 3/00* (2006.01)
*H04N 5/225* (2006.01)
*H04N 5/335* (2011.01)
*H04N 9/31* (2006.01)
*H04N 13/02* (2006.01)
*G06T 7/55* (2017.01)

(52) U.S. Cl.
CPC . *H04N 13/0278* (2013.01); *G02B 2027/0187* (2013.01); *G06T 2207/10024* (2013.01); *G06T 2207/10028* (2013.01)

(56) References Cited

U.S. PATENT DOCUMENTS

| | | | |
|---|---|---|---|
| 7,639,208 B1 | 12/2009 | Ha et al. | |
| 8,736,963 B2 | 5/2014 | Robbins et al. | |
| 8,885,112 B2 | 11/2014 | Popovich et al. | |
| 2006/0028400 A1 | 2/2006 | Lapstun et al. | |
| 2011/0007277 A1 | 1/2011 | Solomon | |
| 2012/0127284 A1 | 5/2012 | Bar-Zeev et al. | |
| 2012/0218301 A1 | 8/2012 | Miller | |
| 2013/0141421 A1* | 6/2013 | Mount | H04N 21/41407 345/419 |
| 2013/0141434 A1 | 6/2013 | Sugden et al. | |
| 2013/0286053 A1 | 10/2013 | Fleck et al. | |
| 2013/0322810 A1* | 12/2013 | Robbins | G02B 5/30 385/11 |
| 2014/0140654 A1 | 5/2014 | Brown et al. | |
| 2014/0160162 A1* | 6/2014 | Balachandreswaran | G03B 17/54 345/633 |
| 2014/0168035 A1 | 6/2014 | Luebke et al. | |
| 2014/0177023 A1 | 6/2014 | Gao et al. | |
| 2014/0266987 A1 | 9/2014 | Magyari | |
| 2014/0313189 A1 | 10/2014 | Dominici et al. | |
| 2014/0340390 A1* | 11/2014 | Lanman | G06T 15/04 345/419 |
| 2015/0348322 A1* | 12/2015 | Ligameri | G02B 27/017 345/633 |
| 2016/0240013 A1* | 8/2016 | Spitzer | G06F 3/013 |

FOREIGN PATENT DOCUMENTS

| | | |
|---|---|---|
| WO | 2013019403 A2 | 2/2013 |
| WO | 2014113455 A1 | 7/2014 |

OTHER PUBLICATIONS

Maimone, et al., "Computational Augmented Reality Eyeglasses", In Proceedings of IEEE International Symposium on Mixed and Augmented Reality, Oct. 1, 2013, 10 pages.

Maimone, et al., "Pinlight Displays: Wide Field of View Augmented Reality Eyeglasses Using Defocused Point Light Sources", In Journal ACM Transactions on Graphics, vol. 33, Issue 4, Jul. 2014, 11 pages.

Lanman, et al., "Near-Eye Light Field Displays", In ACM SIGGRAPH 2013 Emerging Technologies, Jul. 2013 Available at: https://research.nvidia.com/publication/near-eye-light-field-displays.

ISA European Patent Office, International Search Report and Written Opinion Issued in Application No. PCT/US2016/032951, dated Aug. 16, 2016, WIPO, 16 Pages.

Lanman, D. et al., "Near-Eye Light Field Displays", NVIDIA, in ACM SIGGRAPH 2013 Emerging Technologies, Jul. 2013, 10 pages.

"International Preliminary Report on Patentability Issued in PCT Application No. PCT/US2016/032951", dated Sep. 22, 2017, 9 Pages.

* cited by examiner

HYBRID DISPLAY SYSTEM

BACKGROUND

Different display configurations may provide advantages for different display scenarios. For example, some display configurations may have a wider field of view than other display configurations, allowing content to be displayed across a large region.

SUMMARY

Embodiments are disclosed for a display system having multiple fields of view. An example display system comprises a first display configured to produce images across a first field of view, a second display configured to produce images across a second field of view, the second field of view being larger than the first field of view, and a controller configured to selectively present a virtual object via one or more of the first display and the second display based on a feature of the virtual object as displayed within a user's viewspace.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A user may view augmentations to a real-world environment via a display worn near the eyes of the user. Such displays may be referred to as near-eye display devices or head-mounted display (HMD) devices due to the placement of the device when worn by the user. A near-eye display/HMD device may include a see-through display configured to allow the user to view a real-world environment through the display while simultaneously presenting virtual objects via a suitable display technology. Display technologies that may be used for a near-eye display/HMD device include waveguide-based, birdbath, lightfield, and other suitable display configurations. However, each type of display may provide a distinct set of advantages and disadvantages. For example, waveguide-based and birdbath devices may provide high-resolution images with high sharpness and contrast ratios, but may only display across a narrow field of view with weak or no depth cues and low occlusion effects when presented over real-world objects (as viewed through the see-through display). Lightfield displays, such as pinlight displays, may provide images across a wide field of view with perceptible depth cues and the ability to occlude portions of a real-world environment (as viewed through the see-through display). However, such lightfield displays may suffer from low resolution, contrast, and sharpness, resulting in low quality images relative to the waveguide-based/birdbath configurations.

The present disclosure recognizes the complementary features of the above-described display configurations and provides display systems and methods that combine two types of display configurations to selectively present virtual objects via one or both of the types of display configurations based on features of the virtual objects. For example, in a display system with two types of display configurations, virtual objects to be presented in a periphery of a user's viewspace (e.g., the viewspace of the user through a see-through display) may be presented via a display configuration that has a wide field of view. The location of the virtual object may be outside of the field of view of a display configuration with a narrow field of view, and the low resolution/quality of images produced by the configuration with a wide field of view may be tolerable in the peripheral region (e.g., as the user is not directly viewing the object). Other features taken into consideration when selectively presenting virtual objects via different display configurations of a display system will be described in more detail below.

Figure 1:
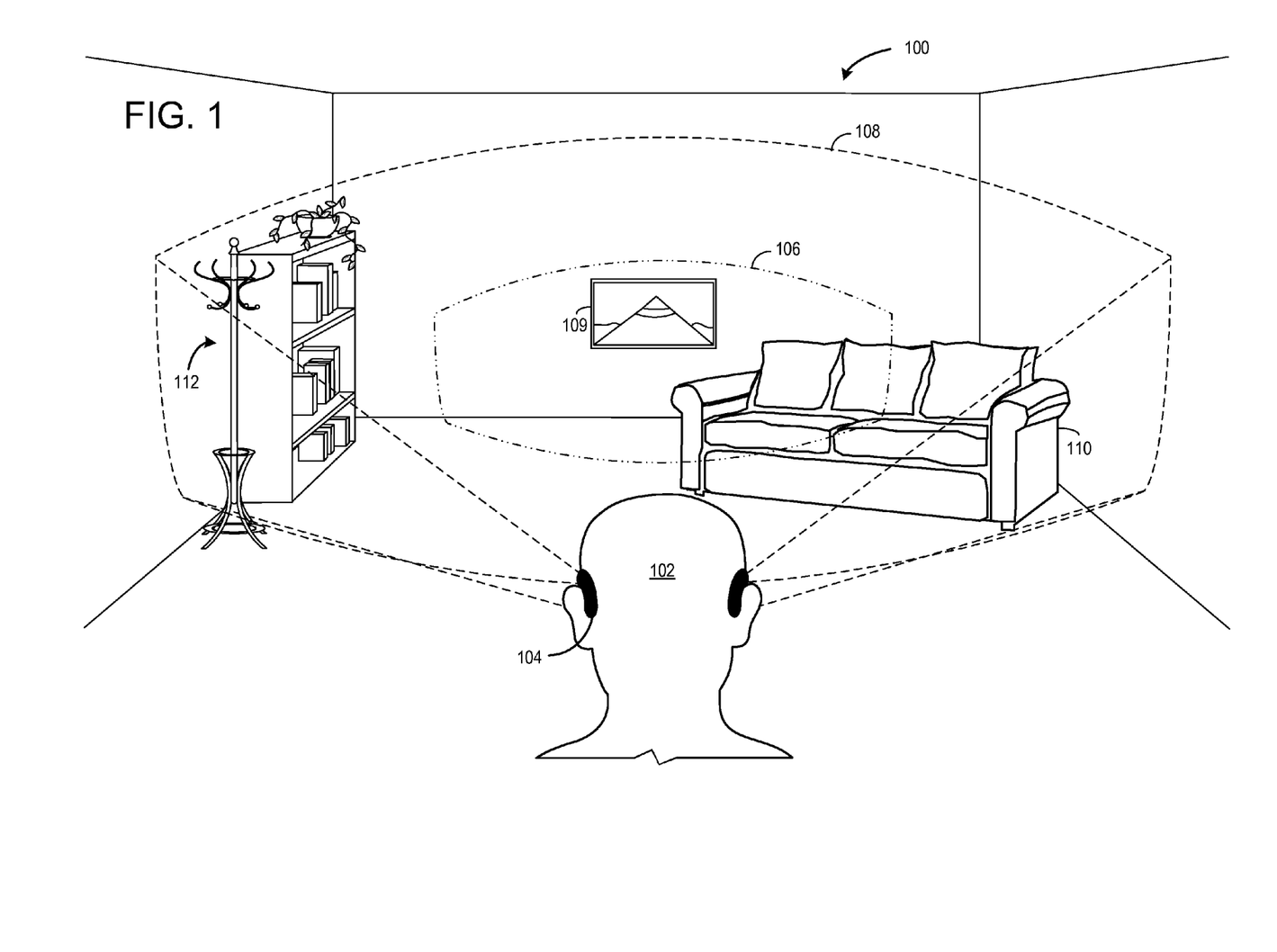
FIG. 1 shows an example environment including a user and a display system having multiple fields of view.

FIG. 1 shows an example environment 100 including a room in which a user 102 may utilize a display system, such as head-mounted display device 104, to view augmentations to the environment. The head-mounted display device 104 may include a hybrid display system that includes two different displays forming a display stack in the device. The display stack may provide a see-through display through which the user views the real-world environment (e.g., environment 100). Any images that are displayed via the display stack may be rendered so as to appear within the environment as viewed through the see-through display. For example, a virtual object displayed via the head-mounted display may appear to be "floating" in front of a user, to occlude one or more real/physical objects in the environment, to overlay one or more real/physical objects in the environment, and/or to otherwise be viewable within the environment.

As shown, each display of the display stack may have a different field of view over which virtual objects may be displayed. For example, a first, narrow, field of view 106 is shown with a first set of dashed lines, while a second, wide, field of view 108 is shown with a second set of dashed lines. As illustrated, the narrow field of view 106 is smaller than the wide field of view 108 (which may include the area occupied by the narrow field of view). In some examples, the narrow field of view 106 may be below 40 degrees, while the wide field of view 108 may be above 40 degrees. In additional or alternative examples, the narrow field of view 106 may be 30 to 60 degrees, while the wide field of view 108 may be above 60 degrees.

The wide field of view 108 may correspond to the full field of view of the head-mounted display device 104 as a whole, and may correspond to the viewspace of the user through the head-mounted display device. Accordingly, as shown in FIG. 1, some objects in the real world environment, such as painting 109 and a portion of couch 110, may be viewable within the narrow field of view 106. Other objects in the real world environment, such as additional household items 112 (e.g., a coat hanger and a bookshelf) and a remaining portion of the couch 110 may be viewable within the wide field of view 108. The real objects and the regions of the real-world environment included in each of the fields of view may change as the user 102 moves his/her head. However, the relative size and spacing of the fields of view may be maintained, thus tying the viewspace of the user to the fields of view, rather than the environment. Virtual objects displayed via the head-mounted display device 104 may be environment-locked (e.g., tied to a real object such that the position of the virtual object changes relative to the user's viewspace as the user moves his/her head but does not change relative to the real object) or user-locked (e.g., tied to the user's viewspace such that the position of the virtual object does not change relative to the user's viewspace as the user moves his/her head but does change relative to real objects in the environment).

The appearance of a given virtual object may vary based on the type of display used to present that virtual object to a user. For example, virtual objects presented via a narrow field of view display may be presented at a higher resolution than virtual objects presented via a wide field of view display. However, virtual objects presented via the wide field of view display may provide increased occlusion of real objects in the environment in a user's viewspace than virtual objects presented via the narrow field of view display. Accordingly, a decision regarding which display to use to display a given virtual object may depend on the features of that object.

Figure 2:
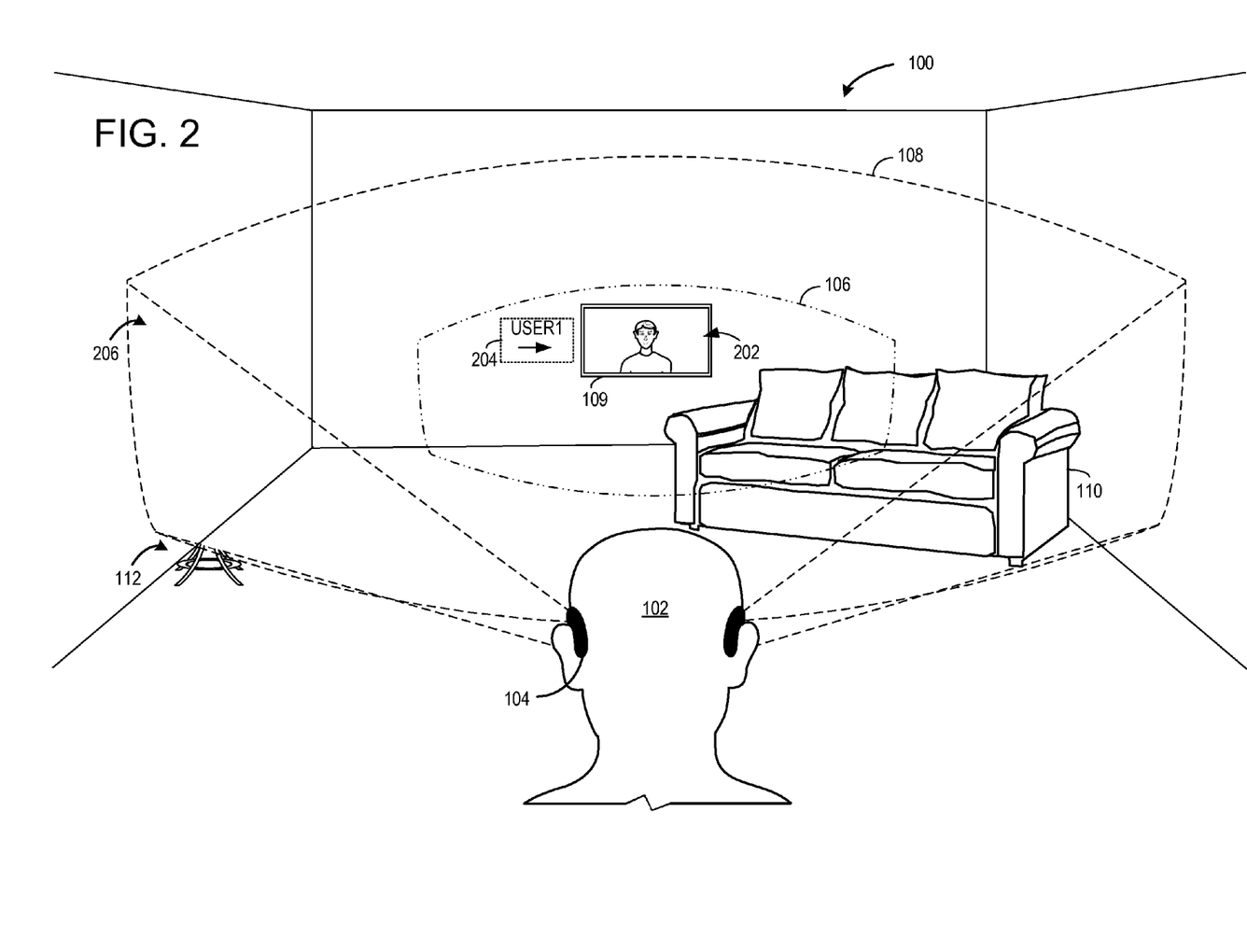
FIG. 2 shows the example environment of FIG. 1 including augmentations displayed via the display system.

FIG. 2 shows an example augmentation to environment 100 as seen through head-mounted display 104. The virtual objects used to augment environment 100 in the illustrated example include an image or video 202 occluding and overlaying the painting 109 from FIG. 1, a text-based label or tag 204 presented on a wall of the room next to the image or video 202, and an occluding feature 206 for occluding the additional household items 112 of FIG. 1. The image or video 202 is located within the narrow field of view 106, meaning that it may be produced (based on its location) by the narrow field of view display configuration, the wide field of view display configuration or a combination of both types of display configurations. As the image or video is intended to cover up the painting 109 (e.g., preventing the user from seeing the painting underneath the augmentation), the wide field of view display configuration may be selected to present the augmentation in order to provide sufficient occlusion of the painting.

However, if fine details of the image or video are intended to be shown (e.g., at a high resolution, sharpness, or contrast ratio), the wide field of view display configuration alone may not be able to provide the intended augmentation. In such cases, a combination of display configurations may be used to present the augmentation. For example, the wide field of view display configuration may be used to occlude the painting 109 with a "blank canvas," such as a solid color or pattern to allow an image to be overlaid via the narrow field of view display configuration (e.g., the actual intended augmentation, such as image or video 202). The "blank canvas" augmentation provided by the wide field of view display configuration may be opaque enough to substantially prevent the user 102 from viewing the real object in the same location as the augmentation (e.g., the painting 109) when viewed through the head-mounted display 104. In other examples, the wide field of view display configuration and the narrow field of view display configuration may each present a different portion of the augmentation (e.g., image or video 202). In still other examples, one or more portions of the augmentation (e.g., image or video 202) may be presented simultaneously with both display configurations.

Text-based label or tag 204 is also present in the narrow field of view 106, allowing this augmentation to be presented via the same example display configurations or combination of display configurations discussed above with respect to the image or video 202. However, as text-based label or tag 204 is placed over a wall, which may provide a suitable canvas (e.g., a solid color or faint pattern) that allows the augmentation to be easily viewed even if it is not opaque enough to provide significant occlusion of the background, the label or tag 204 may be presented by the narrow field of view display configuration. The text of the label or tag 204 may also benefit from the sharpness and high resolution output of the narrow field of view display configuration.

Occluding feature 206 is located outside of the narrow field of view 106 and within the wide field of view 108. Accordingly, it may not be possible to display the occluding feature 206 using the narrow field of view display configuration. Thus, the occluding feature 206 may be displayed via the wide field of view display configuration. As the occluding feature 206 provides an augmentation that is sufficiently opaque (e.g., having a transparency below a threshold) to substantially occlude the additional household items 112 when viewed through the head-mounted display device 104, the wide field of view display configuration may also be more suited to provide such occlusion than the narrow field of view display configuration.

As described above, augmentations may be provided using both display configurations of the head-mounted display device 104 in coordination with one another. For example, as couch 110 is present in both the narrow field of view 106 and the wide field of view 108, virtual objects for augmenting the couch 110 may be presented via a combination of the display configurations. For example, an augmentation that provides an overlay to change an appearance of the couch (e.g., a color, a pattern, a shape, etc.) may be presented in a modular manner based on the location of regions of the augmentation. In such examples, portions of the augmentation that are located within the narrow field of view 106 may be presented by the narrow field of view display configuration (or a combination of the two display configurations, to provide selective occlusion of the environment as described above for example) and portions of the augmentation that are located within the wide field of view 108 (and outside of the narrow field of view 106) may be presented by the wide field of view display configuration.

Additional processing of the augmentation may be carried out in transitional regions, such as an area near the outer border of the narrow field of view 106. For example, the resolution of images presented in the narrow field of view (e.g., by the narrow field of view display configuration) may be higher than the images presented in the wide field of view. Accordingly, the resolution of a virtual object augmenting the couch 110, which is presented in the narrow field of view, may be gradually lowered in regions of the virtual object that are close to an edge of the narrow field of view (e.g., the intersection of the narrow and wide fields of view). For example, regions of the virtual object that are further than a threshold distance from the border may have a first, higher resolution, and regions of the virtual object that are nearer than the threshold distance from the border may have a second, lower resolution. Any suitable gradation of image adjustment (e.g., exponential, linear, interlaced, etc.) may be utilized to reduce the jarring effects of transitioning from virtual objects having high resolution, sharpness, and contrast ratio in the narrow field of view to virtual objects having low resolution, sharpness, and contrast ratio in the wide field of view.

Figure 3:
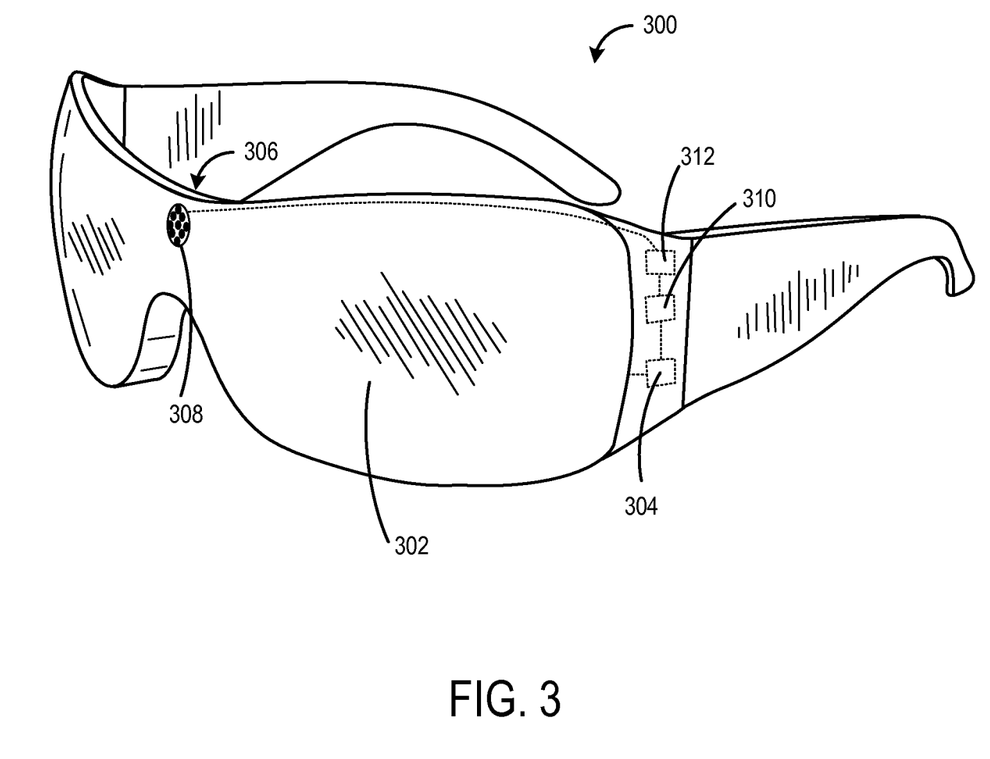
FIG. 3 shows an example head-mounted display device.

FIG. 3 illustrates an example HMD device 300. The illustrated HMD device 300 takes the form of wearable glasses or goggles, but other forms are possible. The HMD device 300 may be an example of HMD device 104 of FIGS. 1 and 2. The HMD device 300 includes a see-through stereoscopic display 302 that may be configured to visually augment an appearance of a physical environment being viewed by the user through the see-through stereoscopic display.

For example, the HMD device 300 may include an image production system 304 that is configured to display virtual objects to the user with the see-through stereoscopic display 302. The virtual objects are visually superimposed onto the physical environment so as to be perceived at various depths and locations. The HMD device 300 may use stereoscopy to visually place a virtual object at a desired depth by displaying separate images of the virtual object to both of the user's eyes. To achieve the perception of depth, the image production system 304 of the HMD device 300 may render the two images of the virtual object at a rendering focal plane of the HMD device 300, such that there is a binocular disparity between the relative positions of the virtual object in the two images. For example, this binocular disparity may be a horizontal disparity where the relative positions of the virtual object in the two images is separated by a distance in the x axis direction. In this embodiment, the x axis may be defined as the axis extending to the left and the right relative to the user, the y axis extending upward and downward relative to the user, and the z axis extending forward and backward relative to the user.

The horizontal disparity between the relative positions of the virtual object in the two images will cause the user to perceive that the virtual object is located at a certain depth within the viewed physical environment due to stereopsis. Using this stereoscopy technique, the HMD device 300 may control the displayed images of the virtual objects, such that the user will perceive that the virtual objects exist at a desired depth and location in the viewed physical environment.

The HMD device 300 includes an optical sensor system 306 that may include one or more optical sensors. In one example, the optical sensor system 306 includes an outward facing optical sensor 308 that may be configured to detect the real-world background from a similar vantage point (e.g., line of sight) as observed by the user through the see-through stereoscopic display 302. The optical sensor system 306 may include a variety of additional sensors, such as a depth camera and an RGB camera, which may be a high definition camera or have another resolution. Although the HMD device 300 may include eye-tracking sensors (e.g., an inward-facing camera), the display stack disclosed herein provides imagery across a wide field of view, thereby allowing images to be displayed wherever a user is looking without necessarily remapping images to accommodate a given eye gaze.

The HMD device 300 may further include a position sensor system 310 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 306 and/or position sensor information received from position sensor system 310 may be used to assess a position and orientation of the vantage point of the see-through stereoscopic display 302 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 312) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

Figure 4:
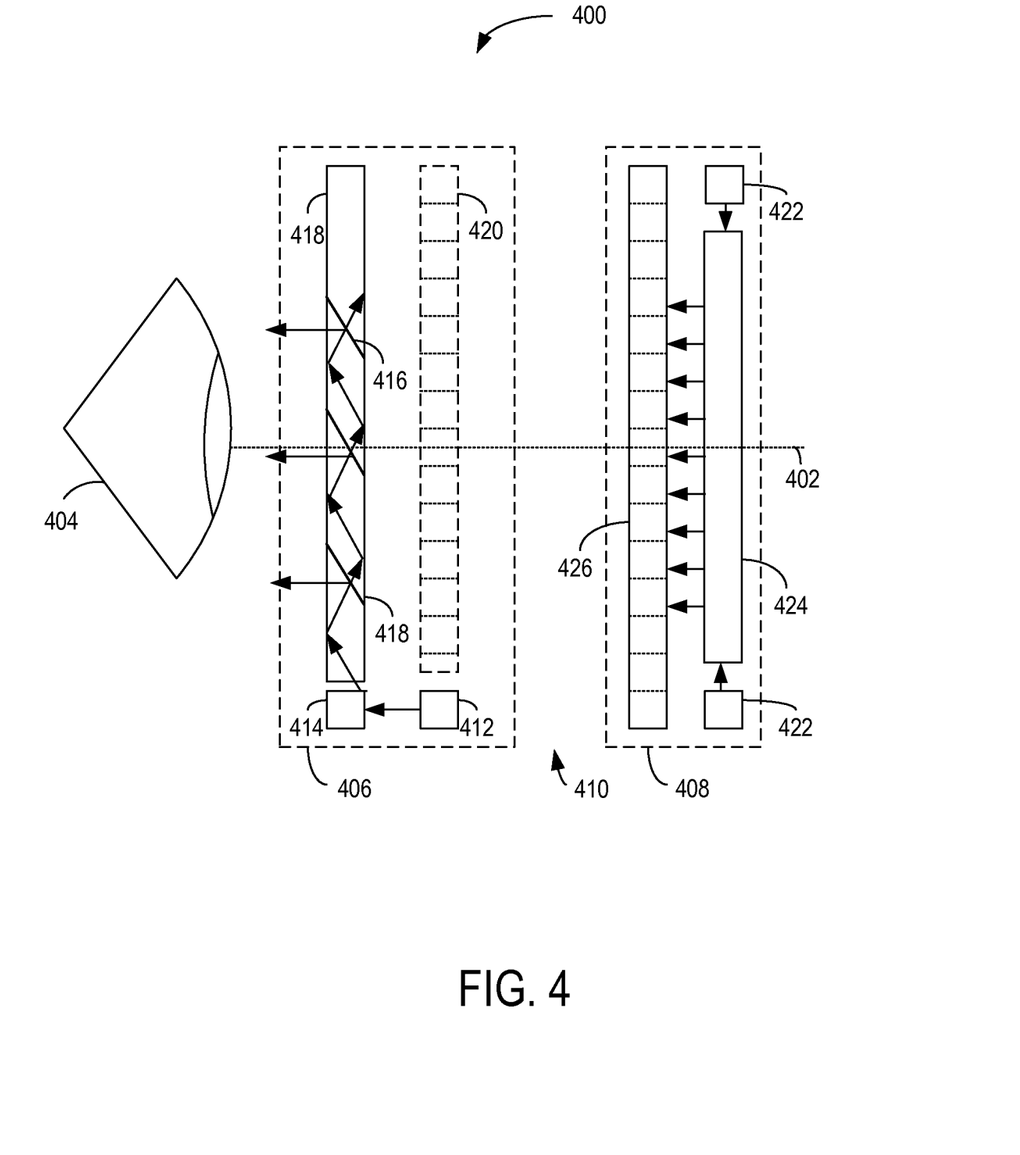
FIG. 4 shows an example stacked display for a head-mounted display device.

FIG. 4 shows an example stacked display 400 for an HMD device (e.g., HMD device 104 of FIGS. 1 and 2 and/or HMD device 300 of FIG. 3) or other display system for presenting virtual images to augment a real-world environment. The stacked display includes, in order along an optical axis 402 extending from an eye 404, a narrow field of view display configuration 406 and a wide field of view display configuration 408. The display configurations 406 and 408 may be separated from one another by an air gap 410 in order to prevent interference between light from each display configuration directed to the eye 404. The narrow field of view display configuration 406 may be positioned closer to the eye 404 than the wide field of view display configuration 408 in order to reduce the affect that the wide field of view display configuration has on the resolution provided by the narrow field of view display configuration. However, the order in which the display configurations are placed in FIG. 4 is exemplary, and the wide field of view display configuration may be placed nearer to the eye than the narrow field of view display configuration in some examples, such as example scenarios in which occlusion capabilities of a display system are weighed higher than resolution capabilities of the display system.

Narrow field of view display configuration 406 may include any suitable display technology that provides images with relatively high resolution, sharpness, and contrast ratios (e.g., with respect to the wide field of view display configuration), across a field of view that is less than 60 degrees. For example, a field of view of the narrow field of view display configuration 406 may be in a range of 30 to 60 degrees. The narrow field of view display may have a resolution of a typical LCoS, LCD, or OLED microdisplay, typically between 320×240 pixels and 1980×1200 pixels. The narrow field of view display configuration may only be capable of producing images without occluding light from the outside world and/or may only be able to occlude an environment by 50 percent or less, which may result in a decreased capability to selectively occlude an environment relative to the wide field of view display configuration. Thus, if the narrow field of view display is presenting an object to the user, the user's experience may be lessened because the virtual object does not appear realistic given its transparency. Accordingly, the same panel that may be used for occlusion is used for the wide field of view display (e.g., a pinlight display, as described in more detail below). The narrow field of view display configuration may also have a decreased capability to provide depth cues for displayed images relative to the wide field of view display configuration. Thus, the wide field of view display configuration may be more suitable for displaying virtual objects associated with interactive virtual or real objects used to provide gesture input to a computing system.

Example displays that may be used for the narrow field of view display configuration 406 include waveguide-type displays, such as volume hologram optics, birdbath displays, and other displays that provide the above-described features for the narrow field of view display configuration. For example, the narrow field of view display configuration may include waveguides/lightguides and reflective, refractive, or diffractive elements for redirecting light from a light source to illuminate a microdisplay and light from the microdisplay back to the eye for presenting a controlled image to a user. A waveguide-type or birdbath display may include one or more prisms, beamsplitters, holographic optical elements, surface relief gratings (or other diffractive gratings) to illuminate the microdisplay (e.g., a liquid crystal on silicon [LCoS] display or other suitable microdisplay) and direct light for a produced image toward the eye, as well as one or more filters and/or lenses to angle the desired light toward the eye.

FIG. 4 provides an example of a waveguide display included in narrow field of view display configuration 406. The waveguide display includes a light source 412 (e.g., a microprojector) that directs light (e.g., via RGB lasers in one example) toward a beam-conditioning optic 414, ensures that the beam enters waveguide 418 and that the image presented from light source 412 is collimated. The light is directed from beam-conditioning optic 414 to a waveguide 418. The waveguide 418 may include one or more facets 416 for partially reflecting light out of the waveguides at different points toward the viewer's eye. These partial reflections form multiple exit pupils, allowing the eye to see the image presented by the image source from various positions. This pupil replication may also be accomplished by other means, such as surface relief gratings, Bragg gratings, switchable gratings etc. For these methods a plurality of gratings can replicate the pupil in a plurality of directions. In some examples, an optional occlusion layer 420 may be included in the display. The occlusion layer 420 may be configured in the form of a pixel array, in which each pixel is an individually addressable electro-mechanical or electro-optical element. Light from the outside world or from the wide field-of-view display configuration can be blocked by occlusion layer 420. In another example of such a system, the occlusion may instead be provided by LCD layer 426 of the wide field of view display.

Such a configuration may be incorporated in a digital display system having an electronic controller operatively coupled to the pixel array. In these examples, the electronic controller directs formation of the display image by sending an appropriate control signal to each pixel of the array, which controls the light modulation of the reflected light from that pixel. Accordingly, the image-forming display may be a digital micromirror device (DMD), in one example. In other examples, the image-forming optic may be a reflective liquid-crystal-on-silicon (LCOS) array, or virtually any other type of pixel array that forms an image by reflection of any portion of the illumination incident upon it. In another implementation, the image-forming display may be an emissive display, such as an array of LED or OLED (Organic LED) emitters. The electronic controller may be in communication with both the narrow field of view display configuration 406 and the wide field of view display configuration 408 (e.g., directly or indirectly) in order to coordinate the display of virtual objects across the user's viewspace, which may span both fields of view provided by the display configurations.

Wide field of view display configuration 408 may include any suitable display that provides a wide field of view (e.g., greater than 60 degrees, and/or greater than 80 degrees, such as a 90 degree field of view), selective occlusion capabilities (e.g., greater occlusion capabilities than the narrow field of view display configuration), and more recognizable depth cues than images produced by the narrow field of view display configuration. One such display configuration may be referred to as an aperture mask display. An aperture mask display may comprise an LCD or other device that spatially modulates one or more converging and/or diverging beams of light directed to the pupil of an eye of a user of the display to provide the above-described features. An example wide field of view display configuration (e.g., an aperture mask display) is a lightfield display, such as a pinlight display. An example pinlight display is illustrated in FIG. 4. As shown, the pinlight display may include RGB light emitting diode (LED) arrays 422, which direct light toward a pinlight array 424. Pinlight array 424 may include an etched acrylic sheet having an array of a plurality of divots that, when illuminated from the side with the LED arrays 422 form a tiled pinlight array to direct light toward a spatial light modulator (e.g., transparent liquid crystal display [LCD]) 426. For any given eye position, the viewer will see a plurality of pixels illuminated by a specific elements of the pinlight array. By tracking the position of the viewer's eye, the computer can provide the correct information for each of the pixels on the spatial light modulator. The example illustrated in FIG. 4 and described above is exemplary, and any suitable display that provides the above-described characteristics of the wide field of view display configuration may be included in the configuration. Another example of a wide field of view display (e.g., an aperture mask display) may use a point source of light focused though the LCD 426 into the pupil of the eye. Such a display may be termed a Maxwellian-view display.

Figure 5A:
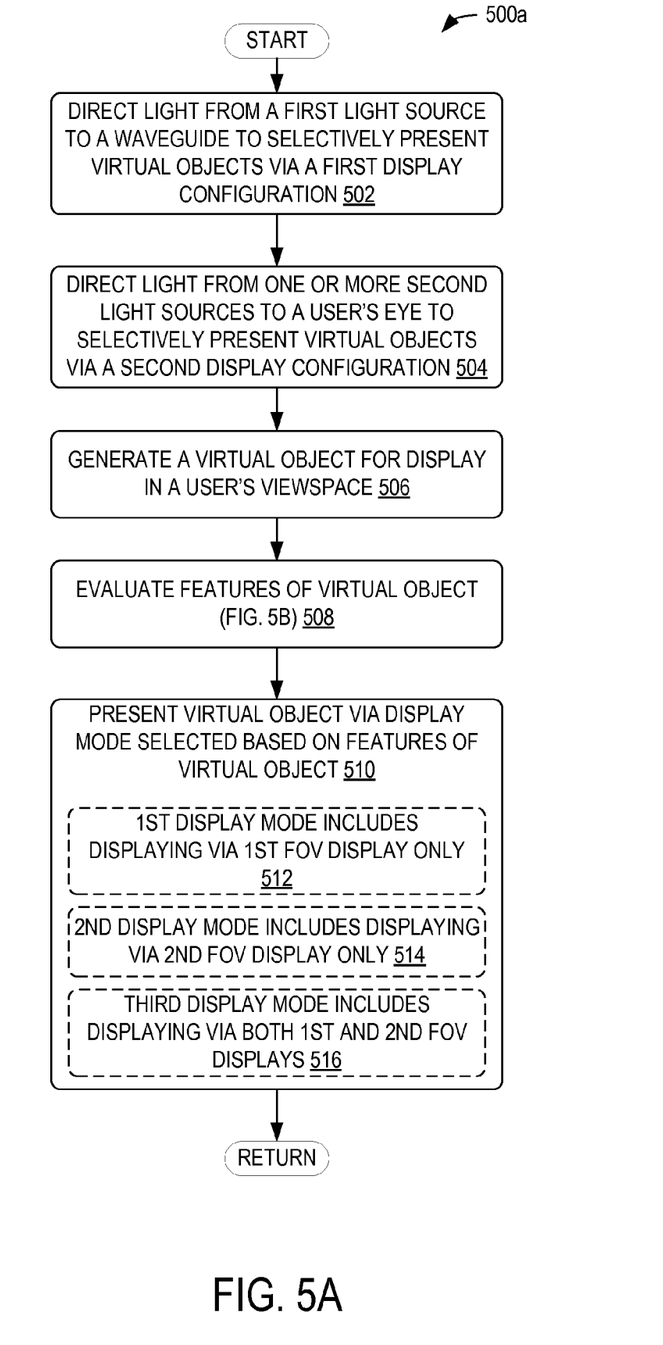
FIGS. 5A and 5B are flow charts for an example method of displaying virtual objects via a display system having multiple fields of view.

Due to the complementary features of the different display configurations described above, virtual objects that are generated to provide augmentation to a real-world environment may be presented via one or both of the display configurations in a coordinated manner. FIG. 5A is a flow chart of a method 500a for determining which display is to be used (e.g., the narrow field of view display configuration, the wide field of view display configuration, or both display configurations) to present the virtual object to the user of a display system. The method 500a may be performed by a suitable controller, such as a controller tied to the display configurations 406 and 408 of FIG. 4 (e.g., a processor of a head-mounted display device, such as HMD device 104 of FIGS. 1 and 2 and/or HMD device 300 of FIG. 3).

At 502, the method includes directing light from a first light source to a waveguide to selectively present virtual objects via a first display configuration. For example, as described above with respect to FIG. 4, light may be directed to a holographic optical element to illuminate a microdisplay for presenting images via a narrow field of view display. As described in method 500*a*, the first display configuration may correspond to the narrow field of view display configurations described herein.

At 504, the method includes directing light from one or more second light sources to a user's eye to selectively present virtual objects via a second display configuration. For example, as described above with respect to FIG. 4, one or more light sources may be directed to an etched sheet of material (e.g., acrylic) to produce a plurality of pinlights that are directed toward a transmissive display to illuminate the transmissive display for producing images viewable by a user. As described in method 500*a*, the second display configuration may correspond to the wide field of view display configurations described herein.

At 506, the method includes generating a virtual object for display in a user's viewspace. For example, the user's viewspace may include the user's field of view through the display system (e.g., through the first and second display configurations). The virtual object may include any suitable displayable element, including representations of physical objects, shapes, patterns or solid swatches of color, and/or any other suitable displayable feature. At 508, the method may include evaluating features of the virtual object. Such features may include a location of the virtual object in the user's viewspace (e.g., in which field of view the virtual object is to be presented, how close the virtual object is relative to the intersection between the fields of view of each display configuration, whether the virtual object will overlap the fields of view, etc.), a size of the virtual object, and a transparency or opacity of the virtual object (e.g., a level of occlusion the virtual object is to provide over the real-world environment). The features may additionally or alternatively include a type of content included in the virtual object (e.g., image, animation, video, text, etc.), depth cues included in the virtual object (e.g., whether the virtual object is tied to a physical object in the real-world environment, whether the virtual object is to be located at a different depth than other virtual objects or physical objects in the environment), and a use of the virtual object (e.g., whether the virtual object is to be used as an interactive element for gesture input and/or to augment a physical object that is to be used as an interactive element for gesture or actuatable input). Additional details regarding the evaluation of features of the virtual object are described below with respect to FIG. 5B.

At 510, the method includes presenting the virtual object via a display mode that is selected based on features of the virtual object. As indicated at 512, a first display mode includes displaying the virtual object via the first (e.g., narrow) field of view display configuration only (e.g., not displaying the virtual object via the second [e.g., wide] field of view display configuration). As indicated at 514, a second display mode includes displaying the virtual object via the second (e.g., wide) field of view display configuration only (e.g., not displaying the virtual object via the first [e.g., narrow] field of view display configuration). As indicated at 516, a third display mode includes displaying the virtual object via both the first and the second field of view display configurations (e.g., in a coordinated manner as described above).

Figure 5B:
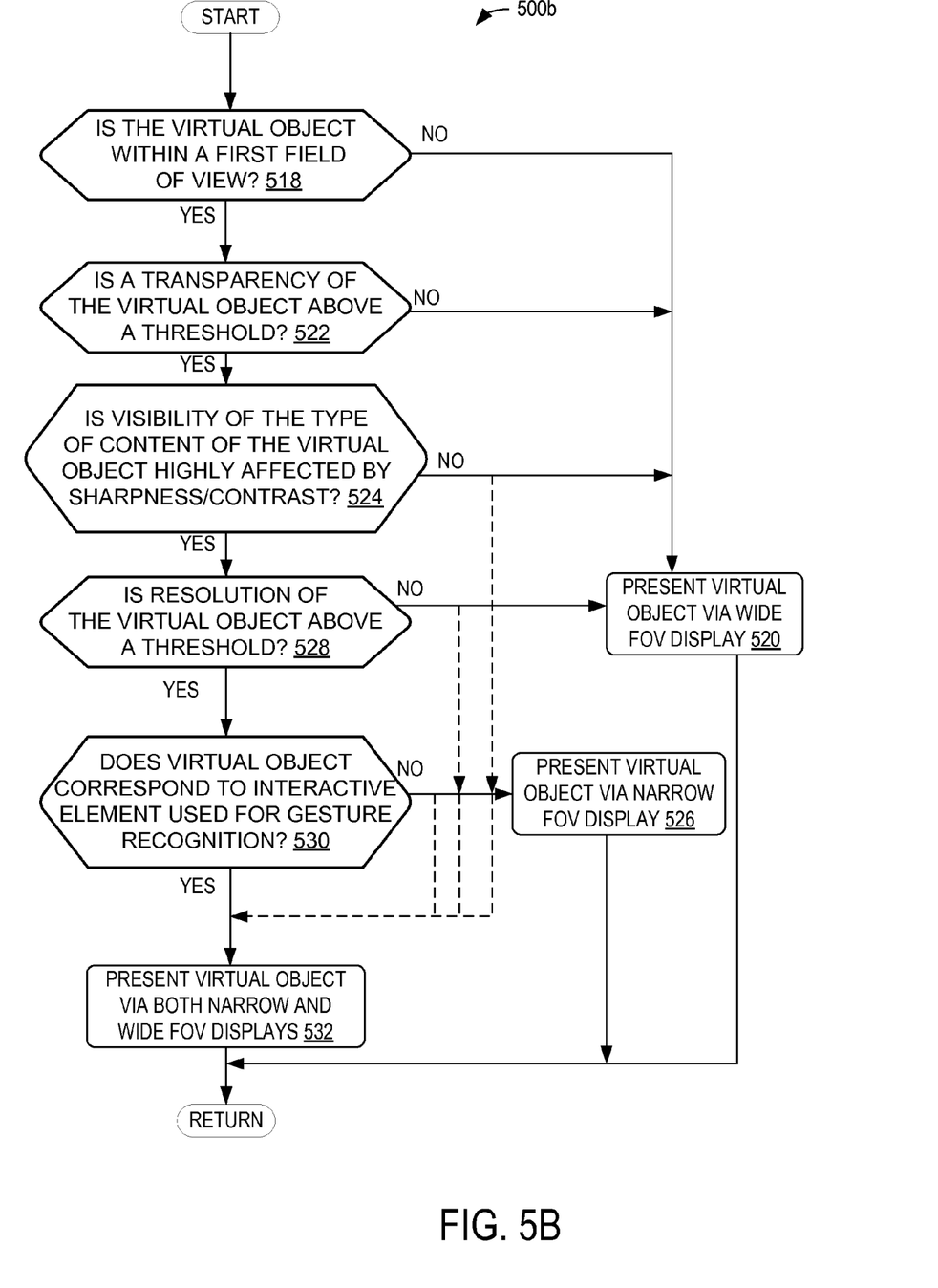

FIG. 5B is a flow chart of a method 500*b* of evaluating features of a virtual object and determining in which mode the virtual object is to be displayed. For example, FIG. 5B may be performed at 508 and/or 510 of method 500*a* of FIG. 5A. Method 500*b* may be performed by the coordinated controller of the display system, as described above with respect to FIG. 5B. At 518, the method includes determining if the virtual object is within a first field of view (e.g., the narrow field of view). The first field of view may represent a location of the virtual object in a central region of the user's viewspace. Outside of the first field of view may correspond to a location of the virtual object in a peripheral region of the user's viewspace. If the virtual object is not within the first field of view (e.g., "NO" at 518), the first display configuration may not be able to display the virtual object, and the method proceeds to 520 to present the virtual object via the wide field of view display configuration.

If the virtual object is within the first field of view (e.g., "YES" at 518), the method proceeds to 522 to determine if a transparency of the virtual object is above a threshold. The transparency of the virtual object may indicate whether the object is to be used to occlude a portion of the real-world environment. For example, the threshold may correspond to a transparency level below which an object will substantially occlude the real-world environment located at the location of the object as viewed through the display system. Transparency levels above the threshold may allow the real-world environment to remain viewable through the virtual object when viewed through the display system, which may not allow the virtual object to occlude the real-world environment. If the transparency of the virtual object is not above the threshold (e.g., the virtual object is to provide occlusion, "NO" at 522), the narrow field of view display configuration may not be capable of presenting the virtual object with sufficient occlusive abilities. Accordingly, the method proceeds to 520 to present the virtual object via the wide field of view display configuration. If the transparency of the virtual object is above the threshold (e.g., "YES" at 522), the method may proceed to 524 to determine whether the visibility of the type of content of the virtual object is highly affected by sharpness/contrast values. For example, text may be unreadable at low sharpness or contrast values, whereas some images or patterns of color may still be able to be understood when sharpness or contrast values are low. As the narrow field of view display configuration may provide increased sharpness and contrast than the wide field of view display, the virtual object may be displayed via the wide field of view display configuration at 520 if the visibility of the type of content of the virtual object is not highly affected by sharpness/contrast values (e.g., "NO" at 524). However, as indicated by the dashed line to 526, the content may still be presented via the narrow field of view display configuration if the content does not demand high sharpness/contrast values.

If the visibility of the type of content is highly affected by sharpness/contrast (e.g., "YES" at 524), the method proceeds to 528 to determine if a resolution of the virtual object is above a threshold. For example, the threshold may be set to the highest achievable resolution that may be provided by the wide field of view display configuration. Similarly to 524, if the resolution is above the threshold, the method may proceed to either 520 or 526 to present the virtual object via either the wide or narrow field of view display. For example, if the resolution of the virtual object is within the capabilities of the wide field of view display configuration, the narrow field of view display configuration may still be utilized to present the virtual object.

If the resolution of the virtual object is above the threshold (e.g., "YES" at 528), the method proceeds to 530 to determine whether the virtual object corresponds to an interactive element used for gesture recognition. For example, interactive elements used for gesture recognition may benefit from depth cues that may be more recognizable when displaying the virtual object via the wide field of view display. If the virtual object does not correspond to an interactive element used for gesture recognition (e.g., "NO" at 530), the method may proceed to 526 to present the virtual object via the narrow field of view display configuration. However, even if the virtual object corresponds to an interactive element used for gesture recognition (e.g., "YES" at 530), since 530 occurs after determining that the virtual object has a resolution above a threshold and is highly affected by sharpness/contrast, only displaying the virtual object via the wide field of view display configuration may not be an option, as the wide field of view display configuration may not provide such levels of image quality. Accordingly, the "YES" branch of 530 proceeds to 532 to present the virtual object via both the wide and narrow field of view displays. For example, the presentation via both displays may be coordinated as described above (e.g., to provide occlusion via a "blank canvas," then display fine details over that and/or to display portions of the virtual image using the different configurations). As illustrated by the dashed lines, any features that result in the determination that the virtual object is to be presented by the narrow field of view display may also correspond to a determination that the virtual object is to be presented via both the narrow and wide field of view displays.

Figure 6A:
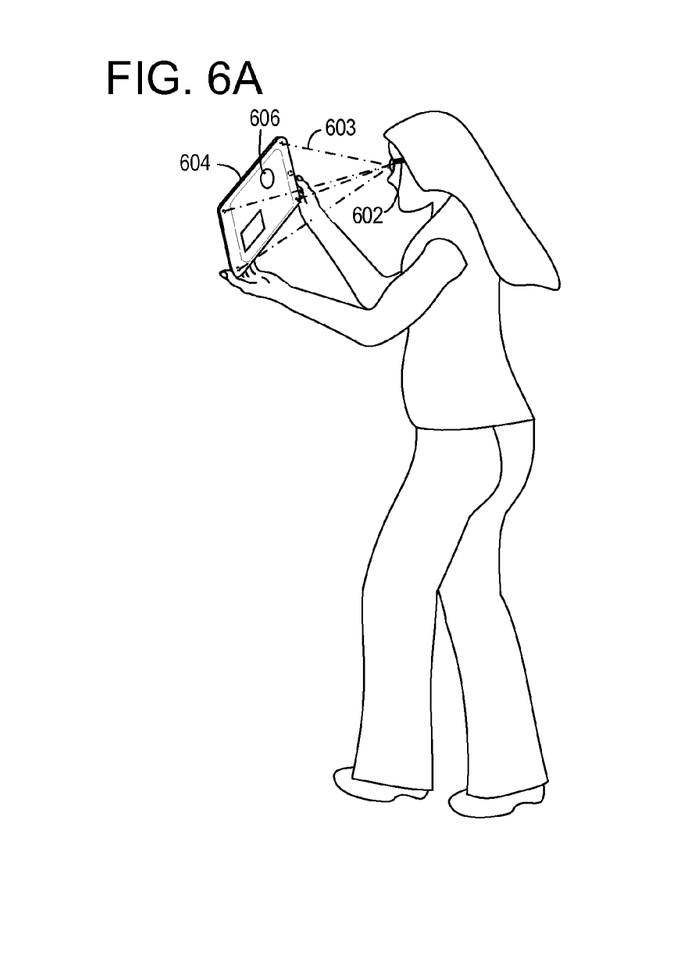
FIGS. 6A and 6B show an example display system coordinated across multiple computing devices.
Figure 6B:
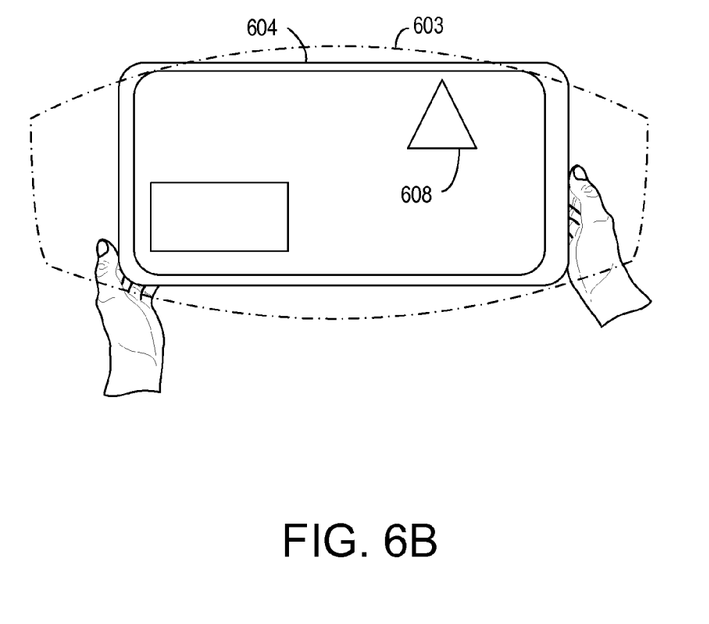

Although examples of display systems in which narrow and wide field of view display configurations are housed in a single device (e.g., a head-mounted display device) are described above, it is to be understood that other display systems may perform similar actions regarding the coordination between different types of display configurations. For example, FIGS. 6A and 6B show an example scenario in which a first display configuration (e.g., a wide field of view display configuration) is included in a first computing device (e.g., a head-mounted display device 602 providing a wide field of view 603) and a second display configuration (e.g., a narrow field of view display configuration) is included in a second computing device (e.g., a computing device 604, such as a laptop, tablet, smartphone, desktop computer monitor, etc.) remote from the first computing device. As illustrated, one or more objects displayed via the computing device 604 may be augmented via the head-mounted display device 602. For example, the computing device 604 and the head-mounted display device may be in communication with one another to share display control and coordinate the presentation of virtual objects. As shown in FIG. 6A, the computing device 604 may display an object 606, which may be occluded by an object 608 when viewed through the head-mounted display 602.

By stacking two display configurations and controlling the display of virtual object via the two display configurations as described above, the advantages of each type of display configurations may be levied to present virtual objects having widely varying features and levels of interaction with a real-world environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
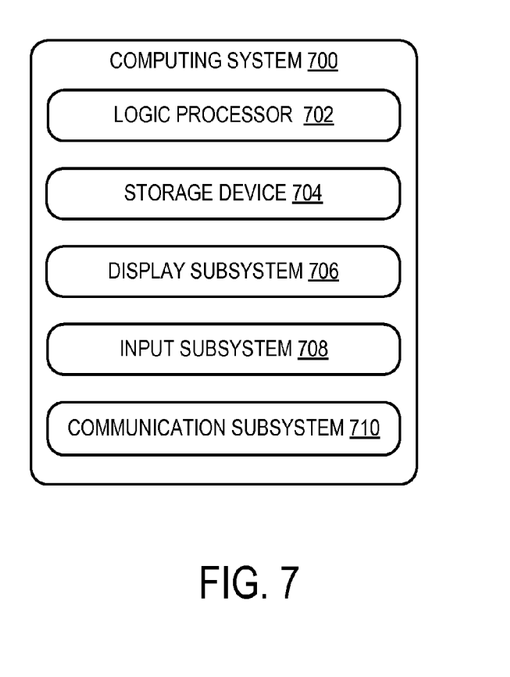
FIG. 7 is a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. For example, computing system 700 may include and/or be included in head-mounted display device 104 of FIGS. 1 and 2 and/or HMD device 300 of FIG. 3.

Computing system 700 includes a logic processor 702 and a storage device 704. Computing system 700 may optionally include a display subsystem 706, input subsystem 708, communication subsystem 710, and/or other components not shown in FIG. 7.

Logic processor 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage device 704 includes one or more physical devices configured to hold instructions executable by the logic machine to implement the methods and processes described herein. When such methods and processes are implemented, the state of storage device 704 may be transformed—e.g., to hold different data.

Storage device 704 may include removable and/or built-in devices. Storage device 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 704 may include volatile, nonvolatile, dynamic, static, read/write, read-only, random-access, sequential-access, location-addressable, file-addressable, and/or content-addressable devices.

It will be appreciated that storage device 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic processor 702 and storage device 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic processor 702 executing instructions held by storage device 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage device 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. For example, display subsystem 706 may include a display stack, such as display stack 400 of FIG. 4. Such display devices may be combined with logic processor 702 and/or storage device 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a display system including a first display configured to produce images across a first field of view, a second display configured to produce images across a second field of view, the second field of view being larger than the first field of view, and a controller configured to selectively present a virtual object via one or more of the first display and the second display based on a feature of the virtual object as displayed within a user's viewspace. In this example display system, the first display may additionally or alternatively include a waveguide-type or birdbath display, and the second display may additionally or alternatively include a compressed lightfield or Maxwellian-view display. In this example display system, the first display may additionally or alternatively include a microprojector that projects into a waveguide and a plurality of gratings for replicating a pupil in a plurality of directions, and wherein the second display includes a pinlight display. In this example display system, the feature may additionally or alternatively include a location of the virtual object in the user's viewspace and selectively presenting the virtual object via one or more of the first and the second display configurations may additionally or alternatively include presenting the virtual object via only the second display responsive to determining that the location of the virtual object is outside of the first field of view. In this example display system, the first display may additionally or alternatively have a field of view that is less than or equal to 60 degrees, and the second display may additionally or alternatively have a field of view that is greater than 60 degrees. In this example display system, the field of view of the first display may additionally or alternatively be between 30 and 60 degrees, inclusive, the field of view of the second display may additionally or alternatively be above 60 degrees, and the second display may additionally or alternatively provide selective occlusion of a real-world environment as viewed through the second display. In this example display system, the first display may additionally or alternatively have a higher resolution than the second display. In this example display system, selectively presenting the virtual object via the first and second display may additionally or alternatively include displaying at least a portion of the virtual object via the second display responsive to determining that a transparency of the virtual object is below a threshold. In this example display system, the display system may additionally or alternatively include, in order along an optical axis extending from a user's eye, the first display, an air gap, and the second display. Any or all of the above-described examples may be combined in any suitable manner in various implementations.

Another example provides a method of producing an image in a display device, the method including directing light from a first light source to a waveguide to selectively present virtual objects via a first display, the first display having a first field of view, directing light from one or more second light sources to a user's eye to selectively present virtual objects via a second display, the second display having a second field of view that is larger than the first field of view, generating a virtual object for display in a user's viewspace, determining a location for the virtual object within the user's viewspace and a feature of the virtual object, if the location for the virtual object is outside of the first field of view, displaying the virtual object with the second display, and if the location for the virtual object is within the first field of view, selectively displaying the virtual object with one or more of the first display and the second display based on the feature of the virtual object. In this example method, the feature may additionally or alternatively include a transparency of the virtual object, and selectively displaying the virtual object with one or more of the first display and the second display may additionally or alternatively include displaying the virtual object with one or more of the first display and the second display if the transparency of the virtual object is above a threshold and displaying the virtual object with at least the second display if the transparency of the virtual object is below the threshold. In this example method, the feature may additionally or alternatively include a designation of the virtual object as an interactive object for a user interface such that the virtual object corresponds to a virtual or real-world element that is used to provide a gesture input to the user interface. In this example method, the feature may additionally or alternatively include a resolution of the virtual object, and selectively displaying the virtual object with the first display may additionally or alternatively include displaying the virtual object with the first display if the resolution of the virtual object is above a threshold and displaying the virtual object with the second display if the resolution of the virtual object is below the threshold. In this example method, the method may additionally or alternatively further include displaying at least a first portion of the virtual object with the first display and at least a second portion of the virtual object with the second display responsive to determining that the virtual object is located within the first field of view and that a transparency of the virtual object is above a threshold. In this example method, the second display may additionally or alternatively include a pinlight display or a Maxwellian-view display. Any or all of the above-described examples may be combined in any suitable manner in various implementations.

Another example provides a head-mounted display device including a first display configured to produce images across a first field of view, the first display including a waveguide, a second display configured to produce images across a second field of view, the second field of view being larger than the first field of view, the second display including an aperture mask display and being separated from the first display by an air gap, and a circuit configured to present a virtual object to a wearer of the head-mounted display device via a selected one of a plurality of display modes based on a feature of the virtual object as displayed within a user's viewspace, the display modes including a first display mode in which the virtual object is displayed via only the first display, a second display mode in which the virtual object is displayed via only the second display, and a third display mode in which the virtual object is displayed via the first display and the second display. In this example head-mount display device, the first display and the second display may additionally or alternatively form a stacked display in which the first display is positioned nearer to an eye of a wearer of the head-mounted display device than the second display. In this example head-mounted display device, the first display may additionally or alternatively have a field of view that is less than or equal to 60 degrees, the second display may additionally or alternatively have a field of view that is greater than 60 degrees, and the second display may additionally or alternatively provide selective occlusion of a real-world environment as viewed through the second display. In this example head-mounted display device, presenting the virtual object to a wearer of the head-mounted display device via a selected one of a plurality of display modes may additionally or alternatively include displaying at least a portion of the virtual object via the second display mode responsive to determining that a transparency of the virtual object is below a threshold. In this example head-mounted display device, presenting the virtual object to a wearer of the head-mounted display device via a selected one of a plurality of display modes may additionally or alternatively include displaying at least a portion of the virtual object via the second display mode responsive to determining that the virtual object is to be presented in a peripheral region of the user's viewspace and displaying at least a portion of the virtual object via the first display mode responsive to determining that the virtual object is to be presented in a central region of the user's viewspace. In this example head-mounted display device, the first display may additionally or alternatively have a higher resolution than second display. In this example head-mounted display device, the aperture mask display may additionally or alternatively include a pinlight display or a Maxwellian-view display. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display system comprising:
   a first transparent display configured to produce images across a first field of view;
   a second transparent display configured to produce images across a second field of view, the second field of view being larger than the first field of view; and
   a controller configured to selectively present a virtual object in an overlapped region of the first field of view and the second field of view, such selective presentation including determining whether to use one or both of the first transparent display and the second transparent display based on occlusion to be provided by the virtual object.

2. The head-mounted display system of claim 1, wherein the first transparent display comprises a waveguide-type or birdbath display, and wherein the second transparent display comprises a compressed lightfield or Maxwellian-view display.

3. The head-mounted display system of claim 2, wherein the first transparent display comprises a microprojector that projects into a waveguide and a plurality of gratings for replicating a pupil in a plurality of directions, and wherein the second transparent display comprises a pinlight display.

4. The head-mounted display system of claim 1, wherein the first transparent display has a field of view that is less than or equal to 60 degrees, and wherein the second transparent display has a field of view that is greater than 60 degrees.

5. The head-mounted display system of claim 4, wherein the field of view of the first transparent display is between 30 and 60 degrees, inclusive, wherein the field of view of the second transparent display is above 60 degrees, and wherein the second transparent display provides selective occlusion of a real-world environment as viewed through the second transparent display.

6. The head-mounted display system of claim 1, wherein the first transparent display has a higher resolution than the second display.

7. The head-mounted display system of claim 1, wherein selectively presenting the virtual object via the first and second transparent display comprises displaying at least a portion of the virtual object via the second transparent display responsive to determining that a transparency of the virtual object is below a threshold.

8. The head-mounted display system of claim 1, wherein the head-mounted display system comprises, in order along an optical axis extending from a user's eye, the first transparent display, an air gap, and the second transparent display.

9. A method of producing an image in a head-mounted display device, the method comprising:
- directing light from a first light source to a waveguide to selectively present virtual objects via a first transparent display, the first transparent display having a first field of view;
- directing light from one or more second light sources to a user's eye to selectively present virtual objects via a second transparent display, the second display having a second field of view that is larger than the first field of view;
- generating a virtual object for display in a user's viewspace;
- determining a location for the virtual object within the user's viewspace;
- if the location for the virtual object is outside of the first field of view, displaying the virtual object with the second transparent display; and
- if the location for the virtual object is within an overlapped region of the first field of view and the second field of view, selectively displaying the virtual object with one or both of the first transparent display and the second transparent display based on occlusion to be provided by the virtual object.

10. The method of claim 9, wherein selectively displaying the virtual object with one or both of the first transparent display and the second transparent display comprises displaying the virtual object with one or both of the first transparent display and the second transparent display if the occlusion to be provided by the virtual object is below a threshold and displaying the virtual object with at least the second transparent display if the occlusion to be provided by the virtual object is above the threshold.

11. The method of claim 9, wherein selectively displaying the virtual object with one or both of the first transparent display and the second transparent display is further based on a designation of the virtual object as an interactive object for a user interface such that the virtual object corresponds to a virtual or real-world element that is used to provide a gesture input to the user interface.

12. The method of claim 9, wherein selectively displaying the virtual object with one or both of the first transparent display and the second transparent display further comprises determining a resolution of the virtual object, then displaying the virtual object with the first transparent display if the resolution of the virtual object is above a threshold and displaying the virtual object with the second transparent display if the resolution of the virtual object is below the threshold.

13. The method of claim 9, further comprising displaying at least a first portion of the virtual object with the first transparent display and at least a second portion of the virtual object with the second transparent display responsive to determining that the virtual object is located within the first field of view and that a transparency of the virtual object is above a threshold.

14. The method of claim 9, wherein the second transparent display comprises a pinlight display or a Maxwellian-view display.

15. A head-mounted display device comprising:
- a first transparent display configured to produce images across a first field of view, the first transparent display comprising a waveguide;
- a second transparent display configured to produce images across a second field of view, the second field of view being larger than the first field of view, the second transparent display comprising an aperture mask display and being separated from the first transparent display by an air gap; and
- a circuit configured to:
  - present a virtual object in an overlapped region of the first field of view and the second field of view to a wearer of the head-mounted display device via a selected one of a plurality of display modes based on occlusion to be provided by the virtual object as displayed within a user's viewspace, the display modes including a first display mode in which the virtual object is displayed via only the first transparent display, a second display mode in which the virtual object is displayed via only the second transparent display, and a third display mode in which the virtual object is displayed via the first transparent display and the second transparent display.

16. The head-mounted display device of claim 15, wherein the first transparent display and the second transparent display form a stacked display in which the first transparent display is positioned nearer to an eye of a wearer of the head-mounted display device than the second transparent display.

17. The head-mounted display device of claim 15, wherein the first transparent display has a field of view that is less than or equal to 60 degrees, wherein the second transparent display has a field of view that is greater than 60 degrees, and wherein the second transparent display provides selective occlusion of a real-world environment as viewed through the second transparent display.

18. The head-mounted display device of claim 15, wherein presenting the virtual object to a wearer of the head-mounted display device via a selected one of a plurality of display modes comprises displaying at least a portion of the virtual object via the second display mode responsive to determining that a transparency of the virtual object is below a threshold.

19. The head-mounted display device of claim 15, wherein presenting the virtual object to a wearer of the head-mounted display device via a selected one of a plurality of display modes comprises displaying at least a portion of the virtual object via the second display mode responsive to determining that the virtual object is to be presented in a peripheral region of the user's viewspace and displaying at least a portion of the virtual object via the first display mode responsive to determining that the virtual object is to be presented in a central region of the user's viewspace.

20. The head-mounted display device of claim 15, wherein the first transparent display has a higher resolution than the second transparent display.

21. The head-mounted display device of claim 15 wherein the aperture mask display comprises a pinlight display or a Maxwellian-view display.

* * * * *